United States Patent [19]

Misener

[11] 4,349,297

[45] Sep. 14, 1982

[54] BOAT DOCK

[76] Inventor: Terrance J. Misener, 5685 N. River Rd., Freeland, Mich. 48623

[21] Appl. No.: 208,238

[22] Filed: Nov. 19, 1980

[51] Int. Cl.³ .............................................. E02B 3/20
[52] U.S. Cl. .................................... 405/221; 182/179;
182/222; 405/218
[58] Field of Search ............... 405/205, 218, 219, 220,
405/221; 14/69.5; 114/263; 182/179, 222

[56] References Cited

U.S. PATENT DOCUMENTS

| | | | |
|---|---|---|---|
| 1,900,319 | 3/1933 | Vermeulen | 405/218 |
| 2,571,337 | 10/1951 | Burnham | 182/179 X |
| 2,592,626 | 4/1952 | Wanless | 405/218 |
| 3,085,651 | 4/1963 | Rich | 182/222 |
| 3,091,203 | 5/1963 | Usab | 405/219 X |
| 3,158,003 | 11/1964 | Dally | 405/218 X |
| 3,964,221 | 6/1976 | Berquist | 405/218 X |
| 4,074,537 | 2/1978 | Gronlie | 405/218 |
| 4,123,912 | 11/1978 | Meldrum | 405/220 |

FOREIGN PATENT DOCUMENTS 763003 12/1956 United Kingdom ................ 405/219

Primary Examiner—David H. Corbin
Attorney, Agent, or Firm—Barnes, Kisselle, Raisch & Choate

[57] ABSTRACT

The boat dock consists of a series of laterally spaced, tubular stanchions of adjustable height having tee fittings at their upper ends threaded into the ends of adjacent tubular stringers. Plastic resin planks are slideably engaged over the tubular stringers.

16 Claims, 11 Drawing Figures

U.S. Patent Sep. 14, 1982 Sheet 4 of 4 4,349,297
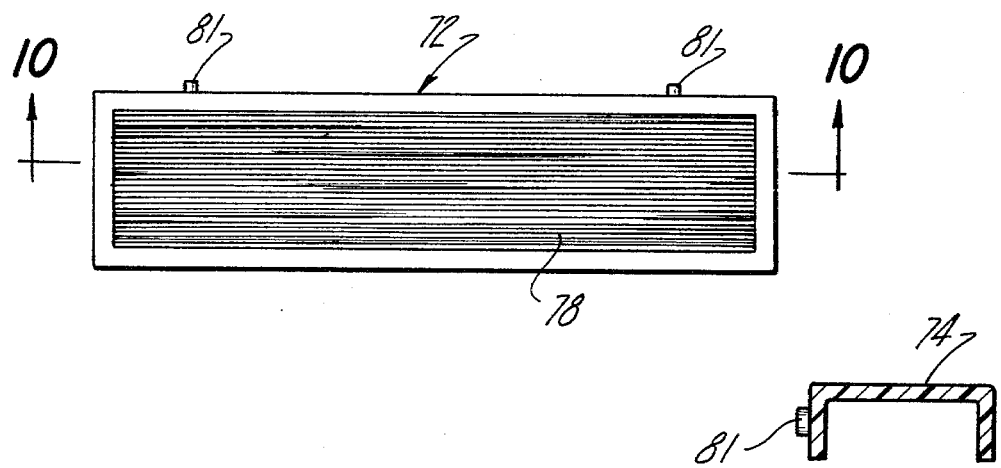
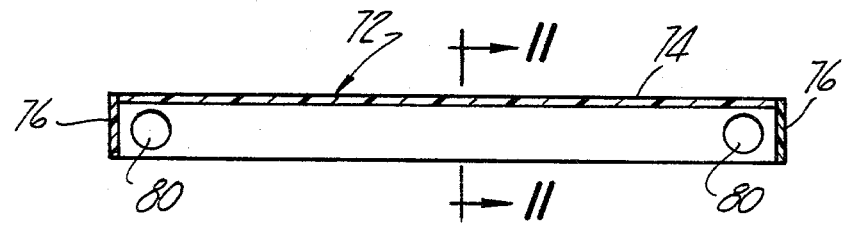

BOAT DOCK

This invention relates to a boat dock.

The object of this invention is to provide a dock of economical construction; adapted to be easily assembled and disassembled by one person without the use of tools; which can be stacked in a compact manner; which, when assembled, does not present any protruding hardware that might cause injury to persons or boats; is unaffected by water, fuel, oil, etc.; and which is designed so that, in the event a component thereof is damaged, it can be easily replaced.

In general, the boat dock of this invention includes a plurality of pairs of laterally-spaced upright stanchions which are adjustable in height. The stanchions are of tubular form and have T-shaped fittings telescoped into their upper ends. The cross bar of each tee is threaded at its opposite ends for connection with the ends of tubular longitudinal stringers on which a succession of plastic resin planks are slideably arranged to provide a dock of the desired length. In one form of the invention the planks are hollow and adapted to be filled with water as a ballast after assembly to provide additional weight for retaining the dock in place.

Other objects, features and advantages of the present invention will become apparent from the following description and accompanying drawings, in which:

FIG. 3 is a perspective view illustrating the manner in which one end of the dock is anchored;

FIG. 9 is a top plan view of another form of plank;

FIG. 10 is a sectional view along the line 10—10 in FIG. 9; and

FIG. 11 is a sectional view along the line 11—11 in FIG. 10.

Figure 1:
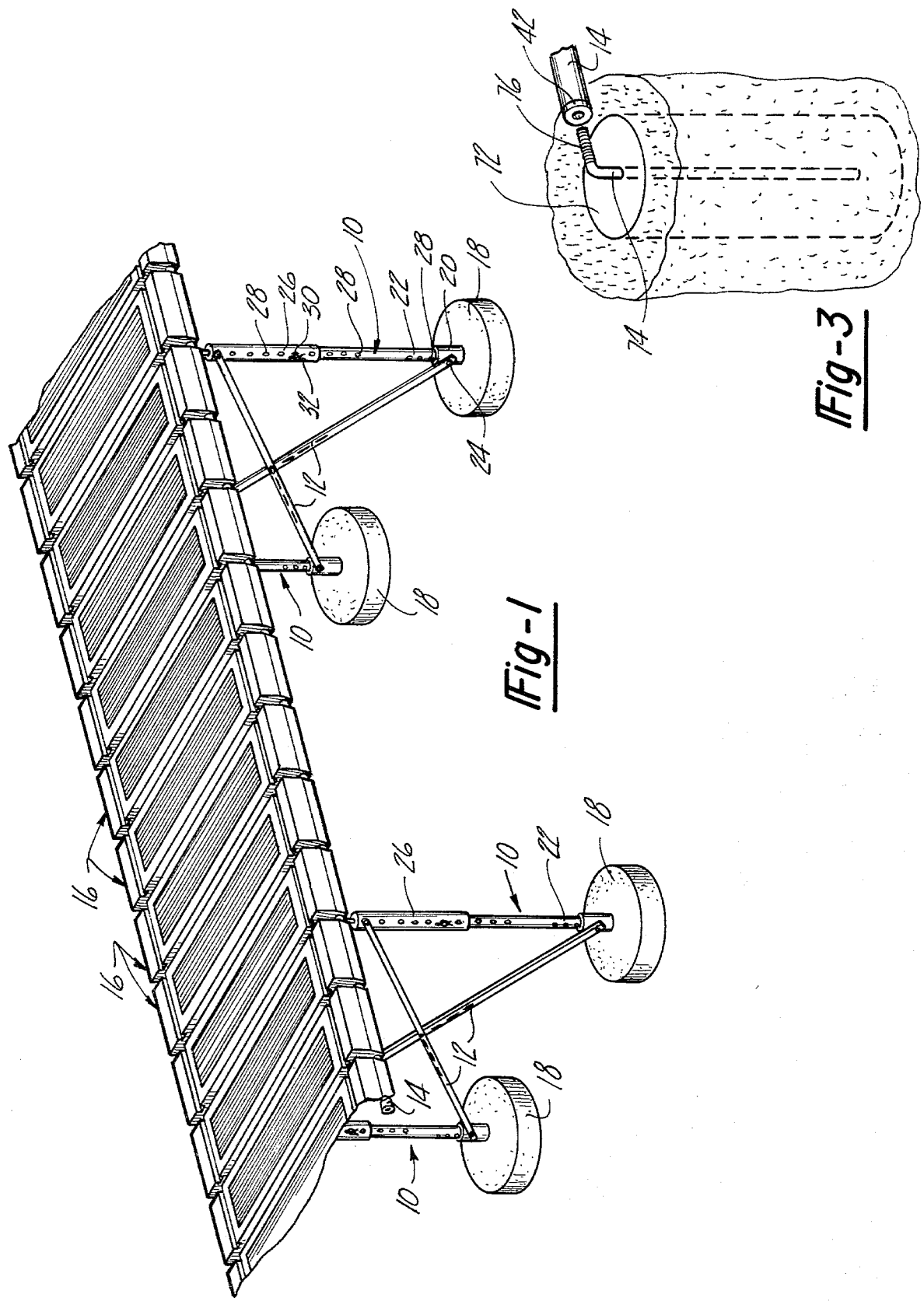
FIG. 1 is a fragmentary perspective view of a dock embodying this invention.
Figure 2:
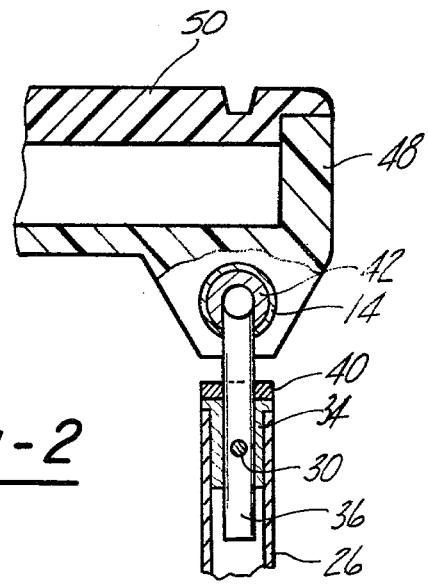
FIG. 2 is a fragmentary sectional view showing the manner in which the planks are secured to the stanchions.

The overall appearance of the dock is illustrated in FIG. 1. It consists of a plurality of pairs of upright stanchions 10 of adjustable height. Lateral stability is imparted to the stanchions 10 of each pair by a pair of cross braces 12. The successive stanchions 10 along each side of the dock are interconnected by tubular stringers 14 on which a series of plastic planks or treads 16 are slideably mounted.

Figure 4:
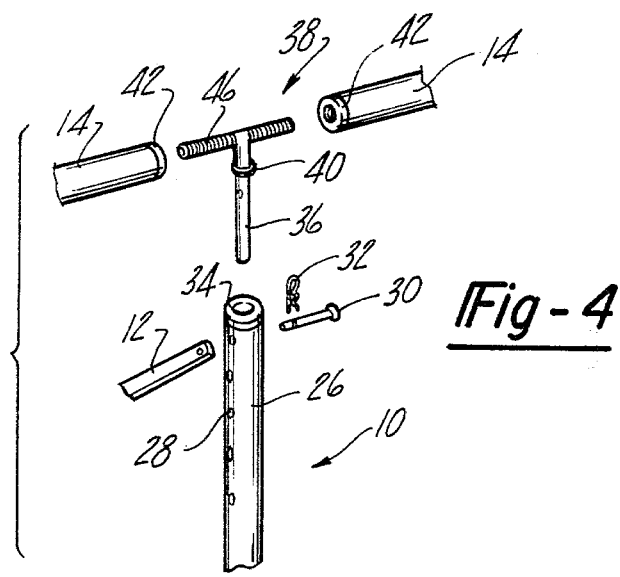
FIG. 4 is an exploded perspective view of the connection between the stringers and stanchions.
Figure 5:
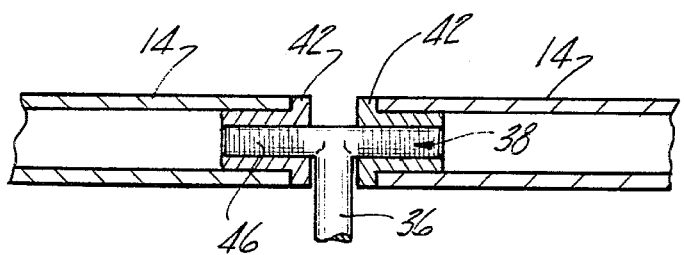
FIG. 5 is a sectional view showing the connection between successive stringers.

Each of the stanchions 10 comprises a concrete footing or base 18 having a short upright aluminum sleeve 20 embedded therein. A tubular leg member 22 has its lower end telescoped into sleeve 20 and connected thereto by a pin 24 which also extends through and anchors the lower end of a brace 12. An upper leg member 26 is telescopically arranged over the upper end of leg 22. Leg members 22,26 have a series of regularly spaced openings 28 therein. Leg members 22,26 are adapted to be secured together when vertically extended to the desired height by a pin 30 passing through a pair of registering openings 28 and secured in place by any suitable means, such as a hairpin clip 32. The upper ends of the cross braces 12 are also adapted to be anchored to the upper leg member 26 by a similar pin 30 inserted through a selected one of the openings 26 and retained in place by a similar hairpin clip 32. Pin 30 and the hairpin clip 32 are best illustrated in FIG. 4. Cross braces 12 are adapted to be secured together at the point where they intersect by means of similar pins and clips.

FIG. 4 illustrates the manner in which the tubular stringers 14 are interconnected with and supported at the upper ends of stanchions 10. Stringers 14 are preferably aluminum tubes and leg members 22,26 are also preferably formed as aluminum tubes. Within the upper end of each upper leg member 26 there is secured an aluminum collared bushing 34. The vertical bore of collar 34 is dimensioned to snugly receive the upright stem 36 of a tee fitting 38. Fitting 38 has a shoulder 40 thereon which limits the extent to which the stem 36 extends downwardly through bushing 34. The bushing and stem are formed with openings therein which, when assembled, register with the uppermost opening 28 on the upper leg member 26 of the stanchion so that the fitting 38 can be held securely in place by the pin 30 which secured the upper end of a cross brace 12 to the stanchion 10.

The length of each stringer 14 corresponds with the longitudinal spacing of the successive stanchions 10. A collared bushing 42 is non-rotatably secured, as by welding or otherwise, within the opposite ends of each stringer 14. Bushings 42 are internally threaded to engage with the threaded ends of the cross bar 44 at the upper end of the stem 36 of fitting 38. It will be appreciated that this interconnection between the stringers 14 and the stanchions 10 is not only rigid, but one which can be assembled and disassembled easily and without any tools.

Figure 6:
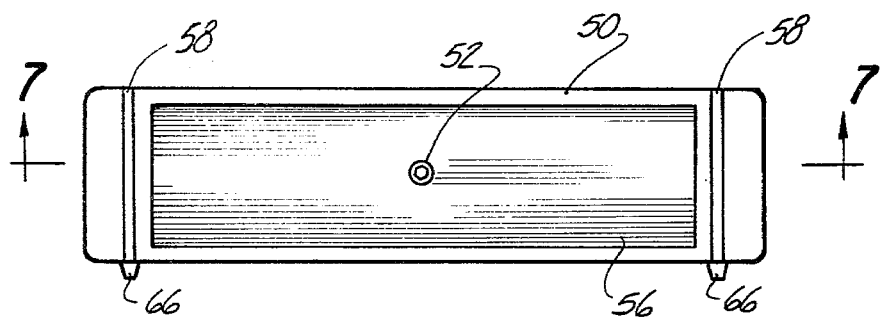
FIG. 6 is a top plan view of one form of plank.
Figure 7:
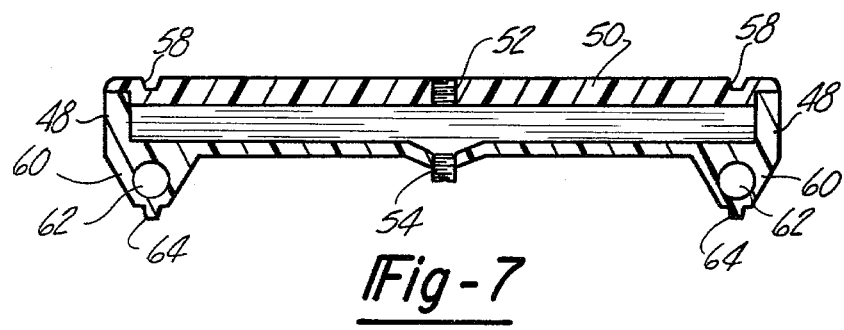
FIG. 7 is a sectional view along the lines 7—7 in FIG. 6.

The planks 16 are formed of a plastic resin material but can take several different forms in accordance with this invention. In the form illustrates in FIGS. 1, 2, 6 and 7 each plank 16 is formed of upper and lower plastic molded sections 48,50. The section 48 is in the form of a receptacle having an upper open end closed by the section 50 which forms the tread portion of the plank. The tread 50 is preferably secured to the upper ends of the side wall of the container section 48 in a generally sealed relation by cementing or otherwise. Each tread 50 is formed with a fill opening closed by a plug 52 and each container member 48 is formed with a drain opening closed by a similar plug 54. The top face of each tread 50 is molded with ridges or other inrregularities to provide a non-slipping tread surface. At each end thereof the top face tread 50 is also preferably molded with a transversely extending groove 58. The container section 48 is molded with a pair of heavy lugs 60 at each end thereof, each lug having a bore 62 extending therethrough and sized to have a relatively close fit with the stringers 14. The lower end of each lug 60 is preferably formed with a rib 64 which conforms in shape and is vertically aligned with one of the grooves 58 on the tread 50. As shown in FIG. 6, each container section 48 is also formed on one side thereof with laterally spaced vertically extending ribs 66.

Figure 8:
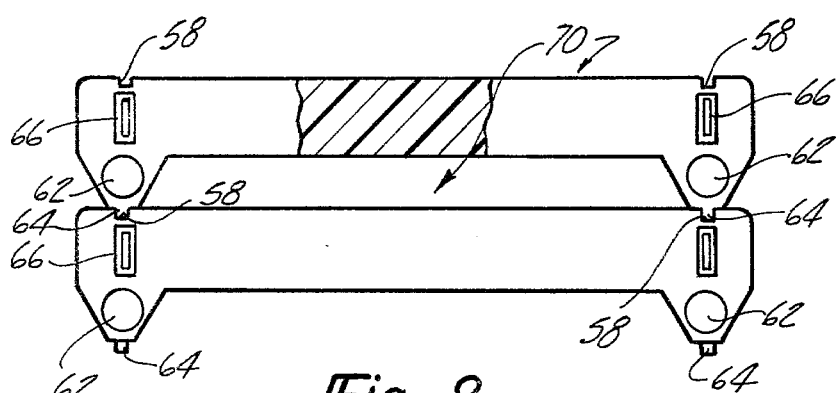
FIG. 8 is a view showing planks stacked for storage.

In FIG. 8 there is illustrated a plank 70 which has an external appearance substantially identical with the plank 16. However, the plank 70 is molded as one solid member rather than as a two component plank formed as a hollow container.

The plank 72 shown in FIGS. 9 and 10 differs from the previous embodiment illustrated primarily in that the body portion 74 of the plank is formed as in inverted U-shaped extrusion (FIG. 11) having a plate 76 cemented to each of its opposite ends. A roughened tread member 78 formed of any suitable sheet material can be cemented to the upper face of body member 74 to provide a non-slipping surface. Openings 80 are cut into the side walls of the body member 74 at each end thereof for engagement with the stringers 14. In addition, abutments 81 can be cemented to one side wall of the body member 74 adjacent the opposite ends thereof.

Each form of the planks 16 disclosed herein is formed of a suitable plastic which has sufficient strength and rigidity to withstand the use to which docks are subjected and also to resist hydrocarbon fuels and oil. Thus, the entire dock structure is unaffected by water, gasoline, etc. and will, therefore, last for an indefinite period of time.

To assemble the dock a pair of concrete anchors 82 are sunk into the ground adjacent the shoreline. Anchors 82 are spaced apart corresponding to the intended lateral spacing of stringers 14. Each anchor 82 has embedded therein a right angle rod 84 which is threaded, as at 86, so that one end of a stringer 14 can be threaded thereover. After the first two laterally spaced stringers 14 are engaged with the anchor rods 84 a series of successive planks 16 are telescopically engaged with the two stringers to form the first section of the dock. The abutments on the side faces of the planks will maintain the planks in uniformly spaced apart relation on the stringers. Thereafter a tee fitting 38 is threaded into the free end of each stringer 14 and the stem 36 of each tee is inserted into the upper end of the previously erected first set of stanchions 10. A second set of stringers 14 are then threaded over the other ends of the secured tee fittings 38 and the dock is extended by successive sections in this manner outwardly over the water to the desired length. At the outer end of the dock, angled rods similar to that illustrated at 84 in FIG. 3 are utilized for securing the outer ends of the end stringers 14 to the upright stanchions 10.

Since all of the components of the dock are of relatively light weight and are secured together by simple fasteners, such as pins, the entire dock can be easily and quickly assembled by one person without the use of tools. It is apparent that the dock can also be disassembled in like fashion and with the same degree of ease. It will also be apparent that, after the dock is disassembled, it can be stored in a compact fashion by stacking the planks one upon the other. With planks such as shown in FIGS. 6 and 8 the mating grooves and ribs enable the planks to be vertically stacked in a stable manner. Furthermore, it will be appreciated that when the planks are formed as hollow containers they can be filled with water after the dock is assembled to add weight to the entire structure so as to retain it in position more firmly. When it is desired to disassemble the dock, the drain plug can be removed from each of the planks so as to drain the ballast and, thus, provide a light weight plank for handling purposes.

I claim:

1. A boat dock comprising a plurality of pairs of laterally spaced, upright tubular stanchions which are adjustable in height, an enlarged base at the lower end of each stanchion adapted to rest on the underwater ground surface to support the stanchion in an upright position, a tee fitting having a depending upright stem telescopically engaged within the upper end of each stanchion, each of said fittings having a cross bar at its upper end extending lengthwise of the dock, a tubular stringer extending lengthwise of the dock between the successive tee fittings, the opposite ends of the cross bars being received in the ends of the successive tubular stringers and rigidly and removably secured thereto, and a plurality of successive plastic resin planks supported at their opposite ends by said stringers, each of said planks having a generally flat top tread surface and a bore adjacent each end thereof extending transversely of the plank, said bores being telescopically and slideably received over said stringers.

2. A dock as called for in claim 1 wherein the opposite ends of the cross bars are threaded into the ends of the adjacent stringers.

3. A dock as called for in claim 2 wherein the stringers have a relatively thin side wall and including bushings secured in the ends of the stringers, said bushings being threaded for engagement with the threaded ends of the cross bar of the fitting.

4. A dock as called for in claim 1 wherein each stanchion comprises a pair of telescopically engaged tubes having a plurality of regularly spaced holes therein and pin means extending through a pair of registering holes in the two tubes for retaining the two tubes at a desired height extension.

5. A dock as called for in claim 4 including intersecting cross braces connecting the stanchions in each pair to impart lateral stability thereto, each cross bar having an opening at its opposite ends registering with selected ones of the openings in the stanchions and pin means extending through the openings for securing the ends of the cross braces to the stanchions adjacent the upper and lower ends thereof.

6. A dock as called for in claim 2 wherein the stem of each tee fitting is slideably received in the upper end of its respective stanchion so that it can be telescopically engaged with a pre-positioned stanchion after one end of the cross bar is threaded into its adjacent stringer and thereafter the end of the next successive stringer can be threaded into engagement with the other end of the cross bar.

7. A dock as called for in claim 1 wherein said planks are plastic resin moldings.

8. A dock as called for in claim 7 wherein each plank is an integrally molded one-piece plastic member.

9. A dock as called for in claim 1 wherein each plank has a pair of protruding abutments at one side thereof adapted to abut against the side face of the next adjacent plank so that the planks are regularly spaced apart along said stringers.

10. A dock as called for in claim 1 wherein each plank has a transverse groove on its top face adjacent each end thereof and a pair of similarly-shaped transversely extending ribs on the bottom side thereof adapted to nest in said grooves when the planks are stacked vertically on one another.

11. A dock as called for in claim 7 wherein said planks are hollow.

12. A dock as called for in claim 11 wherein each plank forms a hollow closed container adapted to be filled with a ballast material.

13. A dock as called for in claim 12 wherein each plank has a closeable opening thereon for filling the plan with a liquid ballast.

14. A dock as called for in claim 13 wherein each plank has a closeable opening on the bottom side thereof for draining the ballast therefrom.

15. A dock as called for in claim 7 wherein the stringer bores are spaced from the hollow portion of the plank.

16. A dock as called for in claim 1 wherein the top tread face of each plank is molded to provide an irregular non-slip surface.

* * * * *